July 21, 1959 W. B. GUGGI 2,896,115
RETRACE DRIVEN DEFLECTION CIRCUIT FOR CATHODE RAY TUBES
Filed June 13, 1957
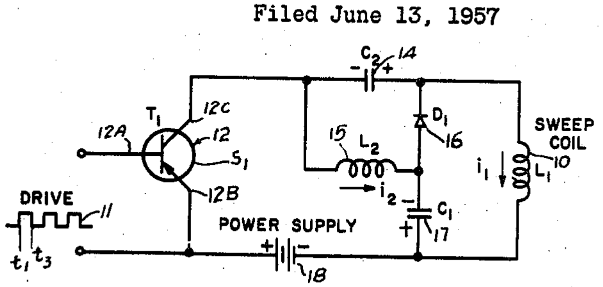
FIG.1
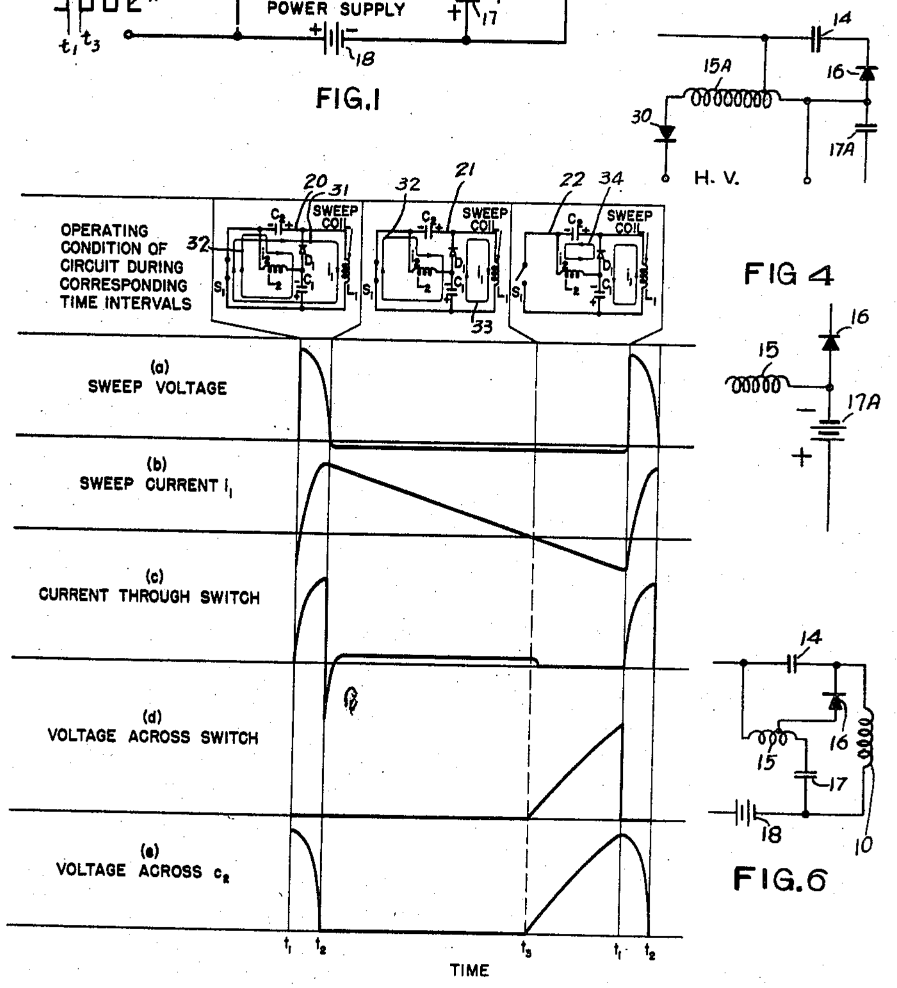
FIG.5, FIG 4, FIG.6
FIG. 2
BASIC SWEEP CIRCUIT WITH VOLTAGE AND CURRENT RELATIONSHIPS
FIG. 3
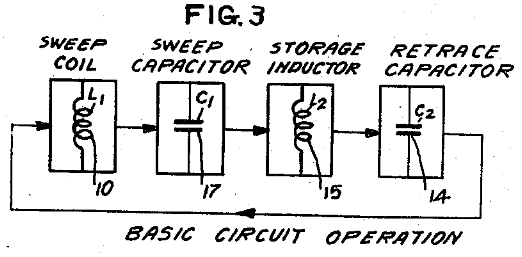
BASIC CIRCUIT OPERATION
INVENTOR.
WALTER B. GUGGI
BY Lyon & Lyon
ATTORNEYS 2,896,115

RETRACE DRIVEN DEFLECTION CIRCUIT FOR CATHODE RAY TUBES

Walter B. Guggi, Palo Alto, Calif., assignor to Radio Corporation of America, New York, N.Y., a corporation of Delaware Application June 13, 1957, Serial No. 665,488

13 Claims. (Cl. 315—27)

The present invention relates to improved means and techniques useful in deflection circuits for cathode ray tubes as used, for example, in television equipment.

The relatively large amount of power consumed in conventional television sets in, for example, the production of the horizontal deflection of a cathode ray beam has long been a problem, particularly when one considers that the total useful deflection work output is zero. The power involved in, for example, a color television receiver is in the order of 45 watts, and all of such power is substantially used in heating circuit components.

In accordance with the present invention, the deflection circuit requires much less power and indeed the power may be reduced by a factor of approximately one-third or one-fourth. Additionally, in accordance with the present invention, the novel circuit described eliminates most of the transient difficulties which, for example, give rise to "ringing" and yet the simplest configuration of such circuit produces a deflection linearity in the resulting cathode ray trace of better than $\pm 5\%$, and may easily be corrected to a much better value, of for instance $\pm 2\%$ or better.

In general, these results are accomplished by circulating energy among various low resistance reactive elements through low dissipation on-off switches. While lost energy is replaced during the early part of the sweep cycle, the circulating energy is actually switched into the deflection coil during the retrace period, and hence the circuit is appropriately designated as a "Retrace Driven Deflection Circuit."

Another object of the present invention therefore is to provide improved means and techniques for accomplishing the above indicated results.

Another object of the present invention is to provide an improved deflection circuit in which switching losses are relatively low due to the on-off method of operation.

Another object of the present invention is to provide an improved deflection circuit of this character in which switching losses may be reduced by using transistors and semiconductor diodes.

Another object of the present invention is to provide an improved deflection circuit of this character in which there is a lower loss in the deflection coil because of its higher operating Q (quality factor) during the retrace interval.

Another object of the present invention is to provide an improved deflection circuit that employs a mode of operation that minimizes energy consuming transient overshoots.

Another object of the present invention is to provide an improved deflection circuit which is relatively simple and efficient for its purpose of producing linear cathode beam sweeps, and in which the sweep amplitude may be adjusted continuously without affecting the linearity or general performance of the circuit.

Another object of the present invention is to provide a circuit of this character which involves a switching operation such that the inrush current upon closing the switch and the voltage build-up upon opening the switch are delayed sufficiently to prevent excessive momentary energy dissipation in the switching device.

Another object of the present invention is to provide an improved circuit of this character which is productive of exceptionally wide deflection angles, even with a relatively small transistor.

Another object of the invention is to provide linearity correction for wide angle deflection applications.

Another object of the present invention is to provide apparatus which allows the use of relatively low frequency power transistors for the switching operation.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a schematic representation of a deflection circuit embodying features of the present invention.

Figure 2 serves to illustrate the different voltage and current relationships in the circuitry illustrated in Figure 1 during different time intervals throughout a cycle of operation.

Figure 3 is a symbolic representation of Figure 1.

Figures 4 and 5 illustrate modifications.

Figure 6 is another modification.

In Figure 1, the horizontal sweep coil associated with a cathode ray tube, a kinescope, or the like, is characterized by the reference numeral 10. The current through such coil 10, represented by $i_1$, is controlled by pulses 11 applied to the control element of a switching device which is illustrated in Figure 1 as a transistor 12. Such pulses 11 are applied between the base electrode 12A and emitter 12B of the transistor; the collector electrode 12C is connected to one terminal of condenser 14 and to one terminal of coil 15. The other terminal of condenser 14 is connected to one terminal of coil 10 and also to one terminal of the diode 16. The other terminals of coil 15 and diode 16 are interconnected and also connected to one terminal of condenser 17, which has its other terminal connected to the other terminal of coil 10 and also to the negative terminal of the power supply 18. The positive terminal of the supply 18 is connected to the emitter 12B.

In accordance with the following discussion, the coil 15 is referred to as a storage inductor, the condenser 17 is referred to as a sweep capacitor, and the condenser 14 is referred to as the retrace capacitor. The diode is preferably of the semiconductor type and of low circuit impedance so as to conduct relatively large sweep currents represented by the current $i_1$.

The operation of the circuit shown in Figure 1 is described with relation to Figure 2 in which the various designated currents during one cycle of operation are represented as ordinates in graphs (*a*), (*b*), (*c*), (*d*) and (*e*). The abscissa in each of such curves is time and the same time interval in each of the curves is correlated by the vertical lines to designate the time interval $t_1$—$t_2$; the time interval $t_2$—$t_3$ and the time interval $t_3$—$t_1$. The vertical lines in Figure 2 serve also to indicate the condition of the circuit shown in Figure 1. Thus, during the time intervals $t_1$—$t_2$ and also $t_2$—$t_3$, one of the pulses 11 is effective to close the switch $S_1$, i.e., to cause the transistor 12 to conduct current between the emitter and collector, and to produce the current flows $i_1$ and $i_2$ during the corresponding time intervals represented by the condition of the circuit at 20 and 21. During the time interval $t_3$—$t_1$, the condition of the circuit is represented at 22 with the switch $S_1$ open, i.e., after termination of one of the series of pulses 11.

Figure 3 shows in symbolic form what is being accomplished. Assuming that energy has been transferred into the sweep coil 10 during the preceding retrace cycle, then during the sweep period energy is transferred from the sweep coil 10 into a large sweep capacitor 17 or constant voltage source which provides a linear decrease of sweep current. At the same time, energy is also transferred from this capacitor 17 or constant voltage source into a storage inductor 15. During the latter part of the sweep period, this energy is stepped up to a higher voltage level by charging a small retrace capacitor 14 and then is returned to the sweep coil 10 during the retrace cycle.

In Figure 2(*a*) the voltage is shown across the sweep coil 10, starting at the instant switch $S_1$ is closed, i.e., transistor 12 is rendered conductive. Figure 2(*b*) shows the corresponding sweep current, and Figure 2(*c*) shows the current flowing through the switch. Assume that the retrace capacitor 14 has reached its final charge with the polarity shown, and that at this instant, at the time $t_1$, the switch 12 is closed. The full capacitor voltage then appears across sweep coil 10 and the closed switch completes a tuned circuit 10, 14 initiating current $i_1$ and $i_2$ in the current loops 31 and 32 respectively. Within one-quarter cycle of the resonant frequency of the series circuit comprising condenser 14 and coil 10, i.e. at time $t_2$. all energy is transferred from condenser 14 to coil 10. The diode 16 blocks current flow through the branch 16, 17 during this initial quarter cycle, i.e., during interval $t_1$—$t_2$.

Capacitor 14 is thus completely discharged at time $t_2$. However, two current components continue to flow within two loops 32 and 33. During the period $t_2$—$t_3$ the sweep current $i_1$ now flows through coil 10, condenser 17 and diode 16, and the loop current $i_2$, which is but a small fraction of the peak sweep current, flows through coil 15, condenser 17 and transistor 12 and continues until the transistor 12 is rendered nonconductive at time $t_3$. The loop current $i_2$ has the purpose of transferring energy from condenser 17 into coil 15. When $S_1$ is opened, at time $t_3$, current $i_2$ continues to flow in coil 15; however, it changes its path and now flows within the loop 34 comprising elements 15, 16, 14, transferring energy from coil 15 to condenser 14. This is indicated by the voltage build-up which now occurs across the switch as shown in Figure 2(*d*) and across the capacitor 14 as shown in Figure 2(*e*). Since condenser 14 is chosen to have a relatively small value, and since considerable energy has been stored in coil 15, the time period $t_3$—$t_1$ permits the transfer of sufficient energy into capacitor 14 to obtain proper retrace performance when $S_1$ is closed again. Going back to Figure 2(*b*), it can be noticed that the sweep current actually crosses the zero line and turns negative. This is made possible during the last portion of the sweep cycle ($t_3$—$t_1$) by the loop current $i_2$ which flows through the circuit 15, 16, 14, as explained above, and essentially permits the sweep current $i_1$ to flow backwards through the diode 16 by subtraction from $i_2$. Sweep current flow stops suddenly when its increasing value reaches the value of the decreasing loop current $i_2$. At this instant $S_1$ is made to close so that energy from condenser 14 may again be discharged into coil 10. Some energy has already been transferred back into coil 10 due to current reversal during time $t_3$—$t_1$, and the voltage across coil 10 therefore builds up further after $S_1$ has been closed, as may be observed again in Figure 2(*a*). This mode of operation indicates that the switch $S_1$ does not have to handle all of the energy circulating within the circuit.

The switch $S_1$ may, of course, be a transistor as shown in Figure 1, or may be a vacuum tube or other suitable switching element. A voltage source 18 has been added for the purpose of replacing circuit losses.

Certain desirable performance characteristics become apparent upon further analysis of this circuit. When $S_1$ is turned on, the current within the switching element (in this case a transistor) builds up from zero to maximum as a sinusoidal function, giving the transistor sufficient time to reach its lowest impedance before appreciable current build-up has occurred. This may be noticed in Figure 2(*b*), in time interval $t_1$—$t_2$. It may also be seen from Figure 2(*c*) that at the turn-off point $t_3$, a relatively small current flows through the transistor, and the voltage build-up remains small for at least several microseconds, as seen in Figure 2(*d*), again providing sufficient time for the transistor to reach its highest impedance before any appreciable voltage has built up. Therefore, the switching operation in either direction is supported by the circuit itself and takes place with relatively low instantaneous peak transistor power dissipation during either switching transition. For horizontal sweep operation, or at rates of approximately 15,000 per second, this feature becomes quite important because of appreciable inherent delays in the switching characteristic of power transistors at those frequencies.

The switching performance of a presently available power transistor applied in this circuit shown in Figure 1 is now compared with its performance switching into a purely resistive load. At 15 kc., switching into a pure resistive load at the same power level would be prohibitive due to the relatively slow transition of the transistor through an area of excessive power dissipation. The operating condition in this sweep circuit shown in Figure 1, however, is such that very high peak currents and peak voltages may be reached without ever exceeding the maximum dissipation limit. Furthermore, the peak deflection current flows through the transistor for only a small portion of the retrace time, at the most a few microseconds, as is shown in Figure 2(*c*). The high voltage peak also occurs for only a very short time, as may be seen from Figure 2(*d*). These two factors permit further increase of the transistor peak current and inverse peak voltage without exceeding dissipation ratings. No spurious high voltage transients are present to limit this increase, as they would in usual sweep circuits. Power transistors may therefore be used quite efficiently in this circuit.

The value of the retrace condenser 14 may be determined from the following formula:

$$C_2=\frac{1}{W^2L}$$

where L is the inductance of coil 10 and the value of W is determined by:

$$W=\frac{\pi}{2T}$$

where $T$=retrace time=quarter cycle of resonance frequency.

In general, the degree of linearity of the resulting sweep current in coil 10 during the time interval $t_2$—$t_3$ increases with increased capacity of condenser 17 and its physical size may be the limiting factor in practical installations. Alternatively, the condenser 17 is replaced by a D.C. constant voltage source 17A as shown in Figure 4.

The storage inductor 15 preferably has several times the inductance of coil 10. The inductance of coil 10 may be calculated in accordance with the following formula:

$$IE=\frac{2W}{T}$$

where I and E are respectively the peak sweep current in amperes and E is the applied constant voltage, in volts (retrace voltage); and where T is the time duration of applied voltage in seconds (retrace time); and where W is the energy stored in the inductance 10.

It was mentioned before that the retrace waveform is sinusoidal; therefore, the retrace voltage actually increases by a factor of $\pi/2$ over the value calculated for a constant voltage pulse, for which the above equation is correct. At the same time, however, the peak voltage requirement is reduced by a factor of approximately two-thirds by the amount of energy that returns into the sweep coil during the later part of the sweep cycle, as was explained before. Therefore, the above equation remains quite adequate for practical calculations, without the necessity of any correction factors, since $$\frac{\pi}{2}\cdot\frac{2}{3}\simeq 1$$

A practical circuit has been built and it was found that linearity within 5% is quite easily obtained and this may be corrected to a much smaller value if desired. Other performance characteristics of such circuit include the following: the deflection angle is 60 degrees at 16 kilovolts accelerating voltage obtained with a 90-degree yoke which, of course, does not give the highest efficiency at this angle. The input power required is 6 watts. The following components were used:

A 90-degree yoke with trifilar winding and 0.25 millihenry inductance.

A germanium junction diode, GE. IN158, and

A power transistor of the type 2N158.

All other components were also standard. The transistor used in such circuit dissipates approximately 3 watts.

It is estimated by results obtained from this circuit, running at approximately one-half the power required for a 90-degree deflection system, that approximately 10–15 watts of D.C. input power will be required to deflect 90 degrees at 16 kilovolts accelerating voltage, using the highly efficient transistor circuit. The D.C. supply voltage will be approximately 20 v., depending on the circuit impedance which again is a function of transistor characteristics. The effect of the D.C. component in this sweep circuit may be effectively eliminated, if desired, by using an output transformer in which, for example, the coil 10 is the primary winding, by capacitive by-passing, or permanent magnets.

Further, it is possible to derive high voltage for the anode of the associated cathode ray tube from this circuit by replacing the storage inductance 15 with a step-up autotransformer 15A and a following rectifier 30 as shown in Figure 5. For low-impedance transistor operation, it may be desirable to use voltage multiplier circuits in order to avoid difficulties in obtaining the proper step-up ratio. Tests show that a relatively large amount of power may be taken from such a transformer 15A without any sweep interference or increase of peak sweep current.

If a lossless sweep coil and lossless diode were available, it is considered that the sweep current would be linear, provided a large sweep capacitor or constant voltage source were used. In practical circuits, however, a logarithmic decay takes place during each sweep cycle causing deflection distortion which is further aggravated by the relative increase of diode resistance with decreasing sweep current. The result is a steadily increasing sweep compression which in general limits the sweep linearity to a value of approximately ±5% when standard commercial components are used throughout.

However, compensation may be provided to compensate for such sweep compression by adding to the sweep voltage a suitable compensating component in the form of a saw tooth voltage which is readily available from another portion of this sweep circuit. Figure 6 shows an improved circuit for obtaining such compensation.

During the time interval, $t_3$—$t_1$, a saw tooth voltage build-up occurs across coil 15 similar to the voltage build-up across condenser 14. A low impedance secondary winding which has the purpose of supplying sufficient compensating signal to the sweep voltage has been effectively added to coil 15, i.e., as shown in Figure 6, one terminal of the diode 16 is connected to a tap on coil 15.

While the circuits shown herein provide substantially linear, transient free sweep current, certain applications may require additional correction, particularly for sweep distortion caused by the geometrical arrangement of wide angle deflection systems applied to flat face cathode ray tubes.

For example, the circuit can be compensated by introducing electrical sweep compression. The early portion of the sweep current may be compensated by proper selection of the magnitude of the sweep capacitor, which permits shifting the sweep current as much as may be desired from the linear portion into the curved portion of a sinusoid. The negative portion of the sweep current may be corrected by reducing, omitting or reversing the compensation obtained in the arrangement shown in Figure 6, or by adding resistance in series with or as an integral part of the sweep coil.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a deflection system of the character described wherein there is a retrace interval and a sweep interval, a sweep coil, through which a substantially linear flow of current with respect to time flows during said sweep interval, a retrace condenser which is charged during a terminating portion of said sweep interval and discharged through said sweep coil during said retrace interval, a voltage source, an electronic switch serially connected with said voltage source, said retrace condenser and said sweep coil, said electronic switch being normally open and functioning to close in response to pulses applied thereto, a constant voltage source, a diode, said constant voltage source and said diode being serially connected in a series circuit which is in parallel with said sweep coil, a storage inductor having one of its terminals connected in said series circuit and at the junction of said constant voltage source and said diode, the other terminal of said inductor being connected to one terminal of said retrace condenser, the other terminal of said retrace condenser being connected to the junction point defined by one terminal of said diode and one terminal of said sweep coil, the terminals of opposite polarity of the first mentioned voltage source and said constant voltage source being connected at the junction point of said sweep coil and said constant voltage source, said diode being so poled that it allows said retrace condenser to be charged with energy from said inductor during said terminating portion of said sweep interval but prevents discharge of said retrace condenser through said inductor during the retrace interval.

2. A deflection system as set forth in claim 1 in which said electronic switch comprises a transistor having its collector and emitter serially connected with the first mentioned power supply, said sweep coil and said retrace condenser.

3. A deflection system as set forth in claim 1 in which said source of constant voltage comprises a condenser which is charged by the current which flows through the sweep coil during the sweep interval.

4. A deflection system as set forth in claim 1 in which said storage inductor comprises a low voltage primary winding of a high voltage transformer for developing a high voltage that is useful as the anode voltage of a cathode ray tube having its cathode beam deflected by said system.

5. In a deflection system of the character described wherein there is a retrace interval and a sweep interval, a sweep coil through which a substantially linear flow of current with respect to time flows during said sweep interval, a storage condenser which is charged during a terminating portion of said sweep interval and discharged through said sweep coil during said retrace interval, a voltage source, an electronic switch, said switch, condenser, sweep coil and voltage source being serially connected in a first series circuit through which flows the current discharging said storage condenser, one terminal of said condenser being connected to one terminal of said coil at a first junction point, a charging circuit for said condenser for charging the same during a terminating portion of said sweep interval comprising: a constant voltage source, a storage inductor, said constant voltage source and said storage inductor being connected in a second series circuit which includes said constant voltage source, said storage inductor, said condenser and said sweep coil, said constant voltage source and said storage inductor having terminals thereof connected at a second junction point, a diode having its terminals connected between said first junction point and said second junction point and being so poled as to prevent discharge of said condenser through said storage inductor during the retrace interval.

6. A system as set forth in claim 5 in which said constant voltage source comprises a condenser.

7. A system as set forth in claim 5 in which said storage inductor comprises a low voltage primary winding of a high voltage transformer.

8. A system as set forth in claim 5 in which said electronic switch comprises a transistor having its emitter and its collector serially connected in said first series circuit.

9. A system as set forth in claim 5 in which said switch is operated in accordance with pulses of a predetermined duration and said condenser and said sweep coils have such values that said condenser is discharged through said sweep coil in a time less than said predetermined duration.

10. In a deflection system of the character described wherein a precharged condenser is discharged through a sweep coil during the retrace interval and wherein said condenser is charged during the terminating portion of the succeeding sweep interval, said condenser and said coil being serially connected with terminals thereof connected at a first junction point, a second series circuit comprising a storage inductor and a constant voltage source connected in shunt with said first series circuit, said storage inductor and said constant voltage source being interconnected at a second junction point, and a diode connected between said first and second junction points and so poled as to prevent discharge of said condenser through said storage inductor during the retrace interval.

11. A system as set forth in claim 10 in which said constant voltage source comprises a condenser.

12. A system as set forth in claim 10 in which said storage inductor comprises a low voltage primary winding of a high voltage transformer.

13. In a deflection system of the character described wherein reactive energy is transferred in turn from a sweep coil, to a sweep capacitor, to a storage inductor, to a retrace capacitor and back to the sweep coil during the sweep and retrace intervals, a first series circuit comprising said retrace capacitor and said sweep coil through which said retrace capacitor discharges through said sweep coil during the retrace interval, a second circuit comprising said sweep capacitor and said sweep coil through which said sweep capacitor is charged in accordance with sweep current flowing through said sweep coil during said sweep interval, a third circuit comprising said sweep capacitor and said storage inductor for transferring energy from said sweep capacitor to said storage inductor during a first portion of said sweep interval, and a fourth circuit including a unidirectional conducting device for transferring energy from said storage inductor to said retrace capacitor only during a second portion of said sweep interval subsequent to said first portion, said unidirectional conducting device being effective to prevent said retrace capacitor from discharging through said storage inductor during said retrace interval.

References Cited in the file of this patent

UNITED STATES PATENTS

| | | |
|---|---|---|
| 2,543,428 | Wendt et al. | Feb. 27, 1951 |
| 2,555,832 | Denton | June 5, 1951 |
| 2,655,615 | Seldin | Oct. 13, 1953 |